March 12, 1968 D. M. HYSINGER ET AL 3,372,534
BAGHOUSE CONSTRUCTION
Filed Sept. 14, 1965 3 Sheets-Sheet 1

INVENTORS
David M. Hysinger
Frederick C. Lindahl
by McDougall, Hersh and Scott
Attys

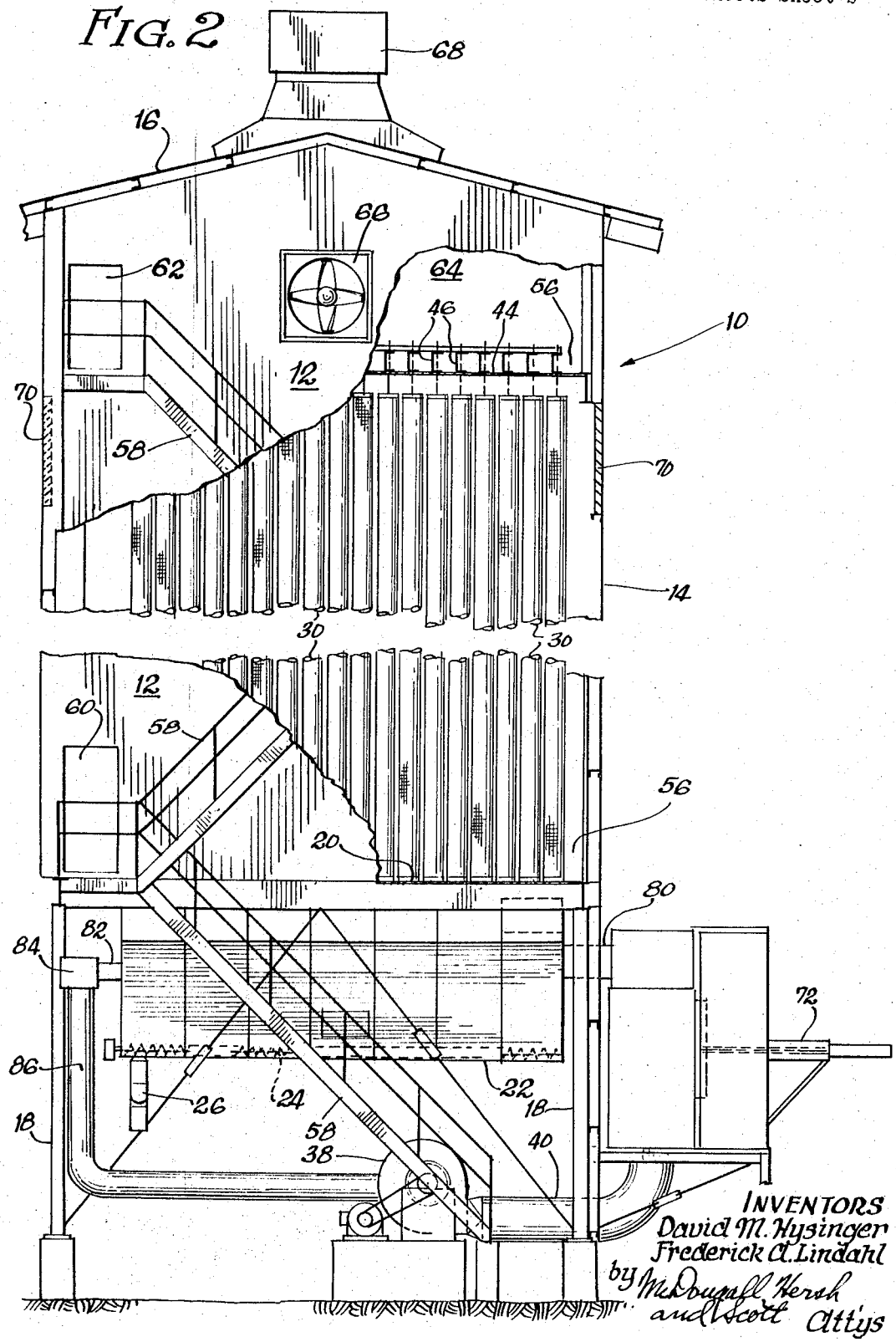

March 12, 1968  D. M. HYSINGER ET AL  3,372,534
BAGHOUSE CONSTRUCTION
Filed Sept. 14, 1965  3 Sheets-Sheet 3
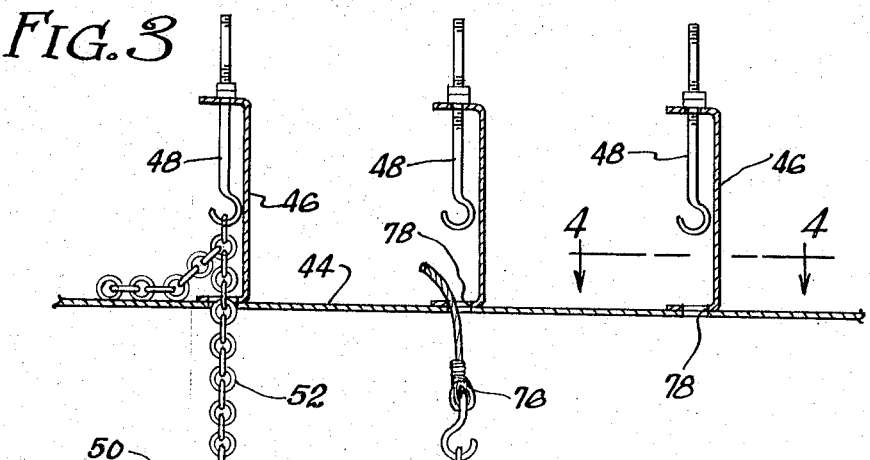
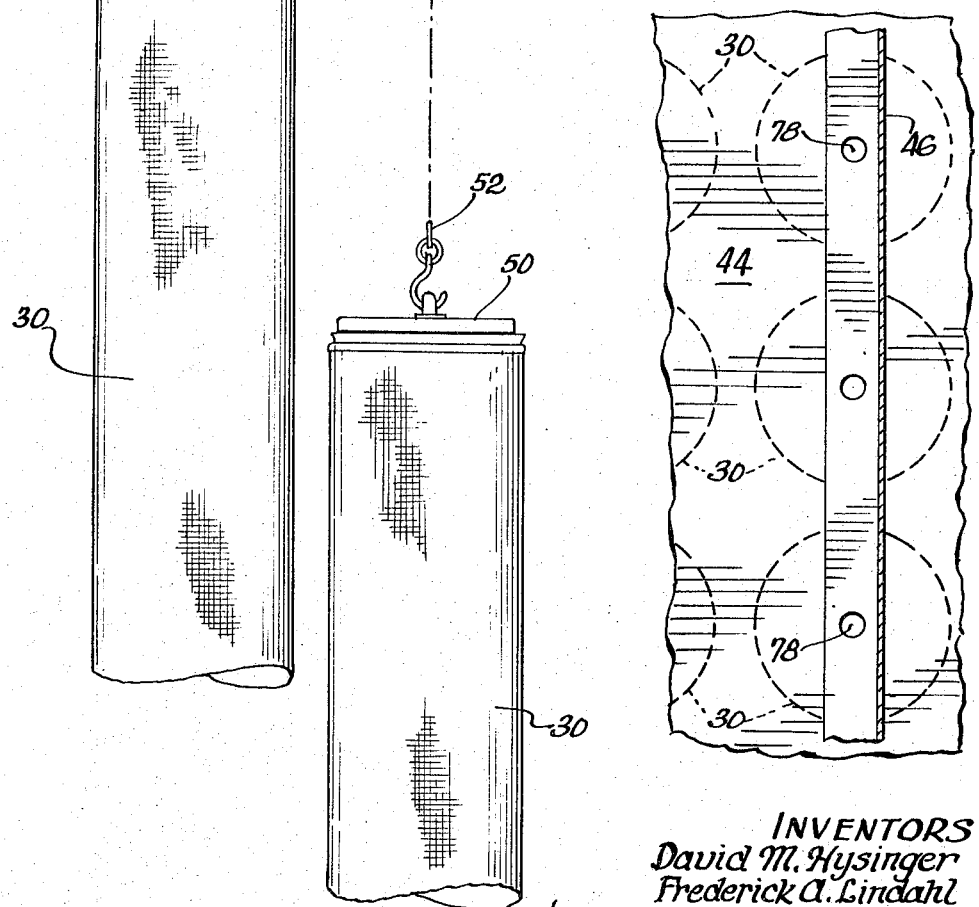
INVENTORS
David M. Hysinger
Frederick A. Lindahl
by McDougall, Hersh & Scott
Attys United States Patent Office 3,372,534
Patented Mar. 12, 1968

3,372,534
BAGHOUSE CONSTRUCTION
David M. Hysinger, Paris, France, and Fredrick A. Lindahl, Novelty, Ohio, assignors to The Wheelabrator Corporation, Mishawaka, Ind., a corporation of Delaware
Filed Sept. 14, 1965, Ser. No. 487,129
4 Claims. (Cl. 55—341)

This invention relates to a construction of the type referred to as a baghouse. Such constructions are employed in conjunction with operations which result in the production of gases containing a relatively high proportion of dust, dirt or other foreign solid particles. The baghouse constructions are adapted to provide for removal of the foreign particles whereby the gaseous medium, usually air, will be cleansed.

Baghouse constructions essentially comprise filter devices provided in the form of tubular members manufactured of flexible material. The filter material usually comprises a fabric or cloth, and the particle laden gases are fed into the tubular filters after which the gas will pass out through the filter fabric. The solid particles entrained in the gases will collect on the surfaces of the filter whereby the proportion of such particles in the gas is substantially reduced. Blowers are provided for driving the gases under pressure into the tubular filters and the cleansed gases are then passed out into the atmosphere or collected for further use, as described hereinafter. In other cases, a suction system can be employed with the inlet to the blowers being on the clean gas side of the filter and drawing gases through the filter by suction, the outlets of the blowers discharging the cleansed gases into the atmosphere.

Constructions employed for suspending the tubular filters can be quite large. This is particularly true where the operation results in the production of large volumes of gas which must be filtered. Where such large scale operations are involved, the expense of maintaining the baghouses in satisfactory operating condition can be relatively high. Accordingly, it is extremely desirable to provide baghouse constructions which are designed whereby the operation can be conducted with maximum efficiency.

One of the major difficulties in maintaining baghouses of conventional construction in their most efficient and effective operating condition is the replacement of individual filter tubes when they deteriorate or wear out to a point where they develop holes in the fabric and start to leak dirty gas instead of filtering it. This deterioration may result from flexing, either by repressurizing or by shaking to remove the excess dust cake, by abrasion from abrasive dust particles, by chemical corrosion, by heat or by a combination of any such factors.

Sometimes leaks will develop at the junction between the lower ends of the filter tubes and the cell plate floors to which they are fastened. In such case, maintenance is required by a man entering the baghouse to reseat or reseal the filter tube in its respective opening in the cell plate floor. Thus, it is important that the filter tubes be readily accessible for replacement or maintenance so that a large section of a baghouse will not have to be shut down for a prolonged period.

One difficulty arising during maintenance and replacement relates to the presence of gases in the baghouse. Since such gases such as in an operation collecting fumes from an electric melting furnace are often hot, workmen may be subjected to unbearable temperatures if they attempt to replace bags during operation of the baghouse. Such gases are also often noxious or poisonous, thereby adding to the difficulties involved in maintenance of the baghouse.

To overcome this problem, previous baghouse constructions have provided for the shutting down of the baghouse before any workmen entered. The baghouse could then be well ventilated, and cooled off thereby providing bearable conditions for the workmen. An operation of this type is, however, undesirable since there is no way to handle gases produced by the mill during such a shutdown of the baghouse except by extensive and expensive compartmenting of the baghouse whereby sections could be shut down and ventilated while other sections were being used. Such conventional systems caused considerable down time for all or for sections of the baghouse with the result that they did not operate at maximum effectiveness.

The problems referred to are particularly critical at the upper levels of the baghouse. Thus, relatively cool outside air is usually drawn into the baghouse by reason of a chimney effect which characterizes such operations. The maximum amounts of the relatively cool outside air are drawn in at the lower level of the operation; and at this level, temperatures remain relatively tolerable and the gases are sufficiently diluted to reduce the concentration of noxious and poisonous gases. At the upper levels in the baghouse, however, more of the filtered gases have mixed with the cooler air and, therefore, very hot and dangerous gases exist at these levels.

It is a general object of this invention to provide a baghouse construction which is characterized by features which permit the operation of the construction at maximum filtering efficiency in removing solid particles from gases and at maximum effectiveness in keeping all of the filter tubes in operation as much of the time as possible.

It is an additional object of this invention to provide a baghouse construction which provides means for properly ventilating areas of the construction whereby replacement of bags and other maintenance operations can be undertaken without the necessity of shutting down the baghouse operation.

These and other objects of this invention will appear hereinafter and for purposes of illustration, but not of limitation, specific embodiments of this invention are shown in the accompanying drawings in which:

FIGURE 2 is a side elevation, partly cut away, taken about the line 2—2 of FIGURE 1;

FIGURE 3 is an enlarged detail view illustrating the means for supporting the filter bags within the construction; and, FIGURE 4 is a detail view taken about the line 4—4 of FIGURE 3.

Figure 1:
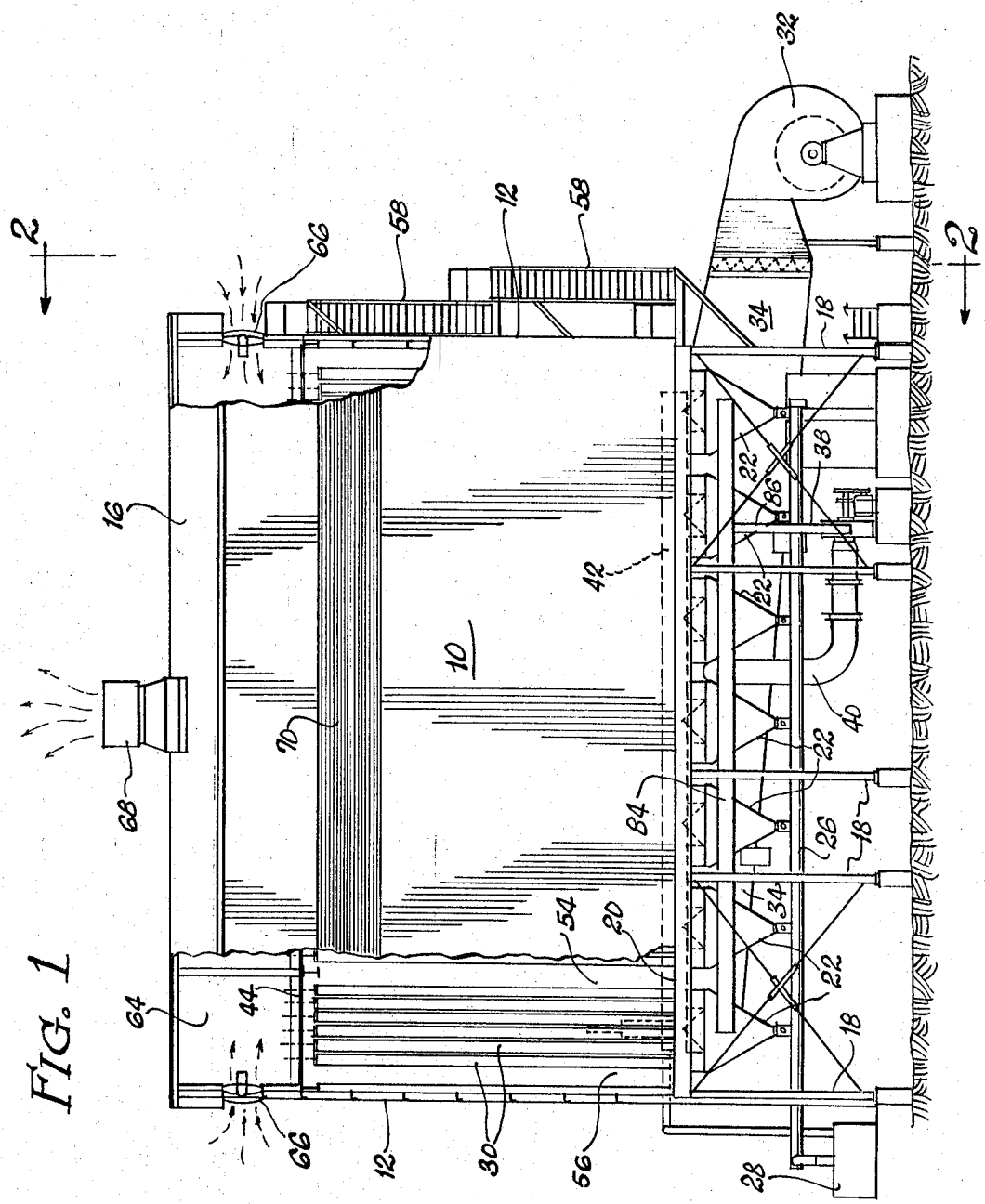
FIGURE 1 is a front elevation, partly cut away, of a baghouse construction characterized by the features of this invention.

The baghouse construction of this invention is designed for supporting a plurality of flexible filter bags whereby particle-laden gases are adapted to be moved through the bags for purposes of cleansing the gases. In the usual operation of constructions of this type, the bags are vertically aligned in parallel relationship, and blower means or the like are provided for forcing the gases upwardly into the interiors of the bags.

In the construction of the instant invention, there is provided an upper suspension floor which carries means for releasibly holding the upper ends of the bags. The bags extend downwardly to a position adjacent the cell plate floor of the construction. Openings are provided in the cell plate floor whereby gas can be driven from underneath the floor into the openings and then through the bags. The upper ends of the bags are closed whereby all such gases must pass outwardly through the filter tubes before being discharged from the baghouse.

One critical aspect of the instant invention relates to the provision of an attic above the suspension floor. This attic is preferably ventilated by means of circulating fans whereby temperatures within the attic can be maintained at a tolerable level and whereby the atmosphere in the attic will be free of significant amounts of noxious or poisonous gases. It could also be of more open construction and be ventilated by natural convection. With an arrangement of this type, workmen can enter the attic and release the upper ends of the bags from their supports whereby the bags can be lowered for replacement or maintenance. Other workmen standing on the main floor which has tolerable conditions due to the aforementioned chimney effect can be made available for handling the bags which are lowered. This entire operation can be undertaken without significantly disrupting the operating efficiency of the baghouse. Furthermore, the operation can be undertaken rapidly since there is no need for providing any prolonged ventilation even in a localized area of the baghouse.

The drawings illustrate a baghouse construction which includes a front wall 10, side walls 12 and a back wall 14. The entire construction is covered by a roof 16, and is supported by means of members 18 extending upwardly from the ground level.

The construction includes a cell plate floor level 20, and a plurality of hoppers 22 are located immediately beneath this cell plate floor. These hoppers collect dust removed periodically from the inside of the filter bags by the shaking or repressurizing operations well known to those skilled in the art. Each of the hoppers carries a screw conveyor 24 along its bottom. A tubular passage 26 carries an additional screw conveyor serving as a common conveyor for the individual hopper conveyors. The common conveyor 26 extends to a collecting box 28.

A plurality of filter bags 30 are vertically suspended above the cell plate floor 20. The cell plate floor defines a plurality of openings for receiving the lower ends of the filter bags. Accordingly, gases introduced beneath the cell plate floor are adapted to be forced upwardly only through the openings and into the filter bags.

A main blower 32 is provided for forcing gases into the filter bags. This blower drives the gases into the plenum chamber 34 which communicates with the respective hoppers through inlet valves 80. Air cylinders are adapted to operate valve plates provided for opening and closing communication between the plenum and the respective hoppers. The construction also includes a repressurizing system including the fan 38 and the repressurizing duct 40. The duct 40 extends to plenum chamber 34. Each hopper also has a repressurizing valve 82 leading to a repressurizing chamber 84 which in turn is connected to return duct 86 leading to the inlet of repressurizing fan 38.

An upper floor 44 is provided for suspending the upper ends of the filter tubes 30. This floor carries a plurality of elongated support members 46, and these support members in turn each carry a plurality of hooks 48. The upper ends of the filter tubes are provided with closure caps 50, and chains 52 are releasibly attached to these caps. By connecting the chains 52 to the hooks 48, the respective tubes are located in their operating positions. Obviously, equivalent mechanical elements permitting quick release of the bags are contemplated.

The bags are preferably arranged in a plurality of rows with the rows being formed by connecting the bags along the elongated members 46. Spaces are preferably provided between rows whereby the bags are arranged in groups. As best illustrated in FIGURE 1, the spacing shown at 54 provides a walkway between groups of bags. Additional walkways are provided at the ends of the rows as shown at 56 on both the upper and lower floors whereby all of the bags in the house will be readily accessible. Stairs 58 are provided in the construction so that workmen may enter the house at either level through the doors 60 and 62.

The space above the suspension floor 44 comprises an attic 64. The opposite side walls 12 are provided with fans 66 for purposes of ventilating the attic. A centrally located outlet vent is also included in the construction whereby air can be drawn into the construction by means of the fans 66 and then passed outwardly through the attic vent 68.

The front and back walls 10 and 14 are each provided with louvers 70. When the gases under pressure are forced into the filter tubes and then outwardly of the tubes, the gases can be discharged through these louvers. In some instances, it may be desirable to recover the cleansed gases and in such a case, an outlet conduit can be utilized in place of the louvers.

In the operation of the construction, the blower 32 will normally move gases upwardly through the cell plate floor 20 and into the bags 30. The pressure generated by the blower will force the gases through the filter fabric and outwardly through the louvers. During the normal filtering cycle, all of valves 80 are in the open position and all of the valves 82 are in the closed position. Fan 38 can be left operating or it can be turned off but in either case no repressurizing air circulates through the system. As a dust cake builds up on the inside of the filter tubes, the gas pressure differential across the filter cloth builds up to undesirable levels. This is overcome by periodically removing excess filter cake from the tubes by, for example, repressurizing. This can also be done by other conventional means such as mechanical shaking of the tubes.

In repressurizing, valve 80 on one hopper is closed and valve 82 on the same hopper is opened. This causes a suction within the hopper and within the filter tubes adjacent said hopper with reverse gas flow through said filter tubes occurring and a partial collapsing of the tubes such that the filter cake is dislodged from the tubes and falls into the hopper below. After said hopper and its respective filter tubes have been put back on line by closing valve 82 and opening valve 80, other hoppers in sequence are isolated in the same manner and repressurized to dislodge the dust cake from the cloth filter.

When it is desired to replace a particular bag or group of bags, a workman can close both valve 80 and valve 82 for the particular area within which he intends to operate. This will close off the gas flow in this area. It will be appreciated that separate compartments within the house are not necessary.

Because of the operation of the attic ventilation means, the attic will be under tolerable conditions, and another workman can proceed to a desired position for releasing a bag. Preferably, the workman will unhook the chain 52 and attach a cable 76 as shown in FIGURE 3. The cable is then employed for lowering the bag to the workman on the cell plate floor at which time a new bag can be attached and then raised to a proper position.

It will be apparent when considering the described operation that the bags can be handled without the necessity for any significant temporary shutdown in the baghouse operation. The attic can be entered by a workman at any time since the ventilation of the attic provides for the introduction of relatively cool atmospheric air whereby the temperatures in the attic are maintained at a tolerable level. The openings 78 in the suspension floor 44, and through which the chains 52 extend, are relatively small whereby a significant amount of noxious or poisonous gases will not enter into the attic. There is no need to wait for any period whatsoever while the chamber is cooled down and ventilated to make the chamber suitable for entry of a workman.

It will be understood that various changes and modifications may be made in the above described construction which provide the characteristics of this invention without departing from the spirit thereof particularly as defined in the following claims.

That which is claimed is:

1. In a baghouse construction comprising a housing having upwardly extending walls, a lower cell plate floor and an upper tube suspension floor extending between said walls, a plurality of flexible filter tubes closed at the top and vertically supported between said floors in operative position and means for directing particle containing gases through the walls of said tubes for removal of said particles by means of a filtering process, the improvement comprising an attic located above said suspension floor, said suspension floor being substantially imperforate whereby the atmosphere in the attic is separated in substantially sealed relation from the atmosphere in the tube section between the floors, inlet and outlet means in communication with the space between the floors for the passage of gases to and from the filter tubes, separate inlet and outlet means connected with the attic for the passage of amospheric air therethrough, fans for circulating said atmospheric air from the separate inlet to the outlet through the attic, means extending into the attic releasably suspending the upper end portions of the filter tubes for raising and lowering the filter tubes to and from operative position, and including walkways located on said cell plate floor and on said suspension floor between rows of tubes whereby workmen can stand on said floors, and means for securing a cable to the upper end of a tube whereby the tube can be lowered to said cell plate floor for maintenance and replacement.

2. A construction in accordance with claim 1 wherein said upper ends of the tubes are attached to said suspension floor by means of chains.

3. A construction in accordance with claim 2 including elongated support members extending upwardly from and across said suspension floor, hooks attached to said support members, openings defined by said suspension floor corresponding to the positions of said hooks whereby said chains are adapted to be attached at one end to said hooks with the other ends of the chains passing through respective openings for suspending the upper ends of the tubes, and wherein each of said rows of tubes is formed by securing tubes along a support member.

4. A construction in accordance with claim 1 wherein said attic is ventilated by means of fans located at opposite ends thereof, and a centrally located exhaust opening in the roof of the attic.

References Cited

UNITED STATES PATENTS

| | | | |
|---|---|---|---|
| 690,455 | 1/1902 | McMeans | 55—287 |
| 1,509,912 | 9/1924 | Stebbins | 55—297 |
| 1,747,131 | 2/1930 | Parsons | 55—304 |
| 1,784,339 | 12/1930 | Clasen et al. | 55—302 |
| 1,821,860 | 9/1931 | Werner et al. | 55—300 |
| 2,021,437 | 11/1935 | Walsh. | |
| 2,732,030 | 1/1965 | Dorfan | 55—341 |
| 3,177,636 | 4/1965 | Jensen | 55—341 |
| 3,212,237 | 10/1965 | Wright | 55—283 |
| 3,217,468 | 11/1965 | O'Dell | 55—341 |

FRANK W. LUTTER, *Primary Examiner.*

HARRY B. THORNTON, *Examiner.*

B. NOZICK, *Assistant Examiner.*